United States Patent
Park (10) Patent No.: US 8,306,483 B2
(45) Date of Patent: Nov. 6, 2012

(54) METHOD AND SYSTEM FOR IMPROVING WIRELESS LINK ROBUSTNESS USING SPATIAL DIVERSITY

(75) Inventor: Minyoung Park, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 408 days.

(21) Appl. No.: 12/647,233

(22) Filed: Dec. 24, 2009

(65) Prior Publication Data

US 2011/0159821 A1 Jun. 30, 2011

(51) Int. Cl.
*H03C 7/02* (2006.01)

(52) U.S. Cl. ........ 455/101; 455/500; 455/504; 455/513; 455/514

(58) Field of Classification Search .................... 455/39, 455/506, 513, 514, 63.4, 562.1, 101, 108, 455/110, 500, 504, 91
See application file for complete search history.

(56) References Cited

U.S. PATENT DOCUMENTS

| | | | |
|---|---|---|---|
| 6,993,134 B1 * | 1/2006 | Epstein | 380/262 |
| 2006/0116092 A1 | 6/2006 | Uno et al. | |
| 2007/0098097 A1 | 5/2007 | Khan et al. | |
| 2007/0249403 A1 | 10/2007 | Gao et al. | |
| 2007/0253386 A1 | 11/2007 | Li et al. | |
| 2007/0273584 A1 * | 11/2007 | Kisigami et al. | 342/378 |
| 2008/0020802 A1 * | 1/2008 | Sudo | 455/562.1 |
| 2008/0248802 A1 | 10/2008 | Krishnamoorthy | |
| 2009/0233556 A1 | 9/2009 | Xia et al. | |
| 2010/0117913 A1 * | 5/2010 | Jung | 343/724 |

OTHER PUBLICATIONS

International Search Report and Written Opinion for PCT Application No. PCT/US2010/058734, mailed on Sep. 1, 2011.
L. Godara, "Application of Antenna Arrays to Mobile Communications, Part II: Beam-Forming and Direction-of-Arrival Considerations", Proceedings of the IEEE, vol. 85, No. 8, Aug. 1997, pp. 1195-1245.
L. Caetano, "60GHz Architecture for Wireless Video Display", SiBeam, Mar. 2006, pp. 1-6.
International Preliminary Report on Patentability for PCT Application No. PCT/US2010/058734, mailed on Jul. 5, 2012; 6 pages.

* cited by examiner

*Primary Examiner* — Tuan Pham
(74) *Attorney, Agent, or Firm* — Shichrur & Co.

(57) ABSTRACT

A system and method for using spatial diversity for improving link quality, particularly wireless link communication. A plurality of propagation paths are used simultaneously for a wireless link, and a plurality of strong propagation paths are selected from among available propagation paths. Propagation path measurements are made to determine strong signal propagation paths. An array antenna at a transmitter and at a receiver are controlled to communicate over a plurality of simultaneous signal propagation paths.

17 Claims, 5 Drawing Sheets

METHOD AND SYSTEM FOR IMPROVING WIRELESS LINK ROBUSTNESS USING SPATIAL DIVERSITY

FIELD OF THE INVENTION

The present invention relates to wireless signal communication, and in particular to communication that may be performed using a plurality transmission paths.

BACKGROUND OF THE INVENTION

A wireless link may be blocked or may experience greater signal attenuation due to a transmission path being blocked, for example by an object or obstacle between a transmitter and a receiver. A wireless link operating in a higher frequency communication band may be more susceptible to attenuation from an obstacle than a wireless link operating in a lower frequency band.

Should a wireless link become interrupted or lost, a system may experience a delay during reacquisition of a link after a transmitter or a receiver may detect a lost link. During a delay, a system may experience loss of some data packets. A transmitter and a receiver, following detection of a lost link, may perform a link-recovery procedure, that may, for example be lengthy, and may interrupt an operation of a wireless application, e.g. a wireless display transmission.

Wireless communication over a wireless link may become interrupted if an obstacle may block a propagation path. An alternate propagation path may be established by re-beamforming between antennas of a wireless transmitter and a receiver, or may be established by relying on a back-up link, for example a wireless link. A change in a beamforming direction may allow a link to re-established. A lost link may be detected, for example by a transmitting device or a receiving device detecting a loss of packets, and a performance of an application may be affected. After a detection of a link that may have been lost, a transmitting device and a receiving device may attempt to re-establish a wireless communication link, and may be along another propagation path, and this process may take a period of time. This time to re-establish a wireless link may increase latency in a wireless link, and may affect performance, for example a performance of an application that may be using a wireless link.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Embodiments of the invention are illustrated by way of example and not limitation in the figures of the accompanying drawings, in which like reference numerals indicate corresponding, analogous or similar elements. It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF EMBODIMENTS OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Embodiments of the invention may be used in a variety of applications. Some embodiments of the invention may be used in conjunction with various devices and systems, for example, a transmitter, a receiver, a transceiver, a transmitter-receiver, a wireless communication station, a wireless communication device, a wireless Access Point (AP), a base station, a modem, a wireless modem, a Personal Computer (PC), a desktop computer, a mobile computer, a laptop computer, a notebook computer, a tablet computer, a netbook computer, a server computer, a handheld computer, a handheld device, a Personal Digital Assistant (PDA) device, a handheld PDA device, any consumer electronic device, a network, a wireless network, a Local Area Network (LAN), a Wireless LAN (WLAN), a Metropolitan Area Network (MAN), a wireless MAN (WMAN), a Wide Area Network (WAN), a Wireless WAN (WWAN), devices and/or networks operating in accordance with existing IEEE 802.11, 802.11a, 802.11b, 802.11e, 802.11g, 802.11h, 802.11i, 802.11n, 802.1x, 802.16, 802.16d, 802.16e, 802.11ad standards and/or future versions and/or derivatives and/or Long Term Evolution (LTE) of the above standards, a Personal Area Network (PAN), a Wireless PAN (WPAN), units and/or devices which may be part of the above WLAN and/or PAN and/or WPAN networks, one-way and/or two-way radio communication systems, cellular radio-telephone communication systems, a cellular telephone, a wireless telephone, a Personal Communications Systems (PCS) device, a PDA device which may incorporate a wireless communication device, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like. Some embodiments of the invention may be used in conjunction with one or more types of wireless communication signals and/or systems, for example Radio Frequency (RF), Infra Red (IR), Frequency-Division Multiplexing (FDM), Orthogonal FDM (OFDM) Time-Division Multiplexing (TDM), Time Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MCM), Discrete Multi-Tone (DMT), Bluetooth®, ZigBee™, or the like. Embodiments of the invention may be used in various other apparatuses, devices systems and/or networks.

Although embodiments of the invention are not limited in this regard, discussions utilizing terms such as, for example, "processing," "computing," "calculating," "determining," "establishing," "analyzing," "checking," or the like, may refer to operation(s) and/or processes of a computer, a computing platform, a computing system, or other electronic computing device, that manipulate and/or transforms data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more." The terms "plurality" or "a plurality" may be used throughout the specification to describe two or more components, devices, elements, units, parameters, or the like. For example, "a plurality of stations" may include two or more stations.

According to an embodiment of the invention data may be transmitted from a transmitter and received by a receiver over a plurality of propagation paths. These paths may include, or be in addition to, a strongest signal propagation path. Should one or more paths become blocked, communication may continue on at least one other path, as all paths may be simultaneously carrying data. A path may become blocked in any number of ways, for example by an obstacle being introduced in a path between a transmitting device and a receiving device. Any path that may remain un-blocked may continue to carry data. A transmitter and a receiver may connect to each other via a plurality of spatially separated propagation paths. An antenna at both a transmitter and a receiver may be configured to form a plurality of beams, for example radiation pattern beams, and such beams may correspond to spatially separated signal propagation paths.

Figure 1:
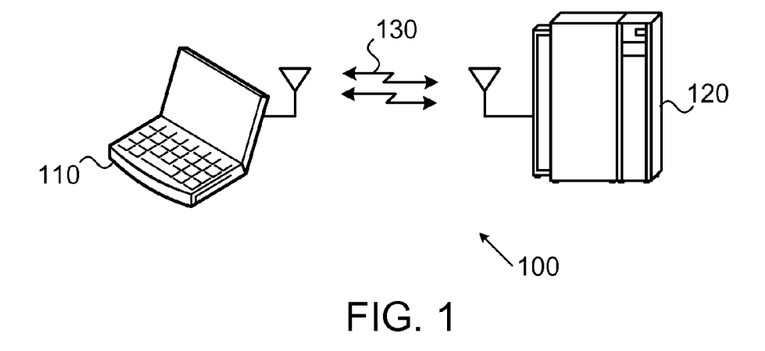
FIG. 1 depicts an exemplary block diagram illustrating an embodiment of a system according to embodiments of the present invention.

Referring to FIG. 1, embodiments of the present invention may comprise a system 100 as schematically depicted. Device 110 may be a computing device or an access point, and may be connected to a network. Device 110 may have a memory, which may be local to the device or remotely accessible, for example over a network. Device 110 may comprise or be associated with a communication module, for example, a modem, antenna, etc., which may enable device 110 to send and/or receive information over a wireless channel. Device 110 may further comprise or be associated with a processor for performing beamforming described herein, including, for example, performing calculations and directing an antenna to form a plurality of propagation paths. Although device 110 may be a transmitting device, a receiving device, or both, for simplicity it may be referred to as a source device.

Wireless channel 130 may comprise or include a plurality of wireless propagation paths. A propagation path may be a direct path or it may be a path that may be formed, for example by a signal reflecting from a surface or an object, or a plurality of surfaces or objects. Among a plurality of propagation paths, one or a subset of the paths may have stronger signal strength than other paths. The channel may carry a plurality of paths simultaneously. Paths may be formed, for example by a device that may have an antenna capable of forming one or more paths, e.g. an array antenna, which may include a plurality of antenna elements. Elements of an antenna may be capable of being driven separately, and may be capable of being independently driven by the same, similar or different signals. Signals to one or more antenna elements may differ by a phase and/or amplitude from one or more signals sent to other antenna elements in order to steer the beam, or produce beamforming.

Device 120 may be receiving and/or sending information over a channel, for example a wireless channel. Device 120 may be a display device, a receiver device, or other device for disseminating audio signals, video signals and/or data, and the like. Device 120 may be a computing device or an access point, and may be connected to a network. Device 120 may have a memory, and a memory may be local to a device or it may remotely accessible, for example over a network. Device 120 may comprise or be associated with a communication module, for example, a modem, antenna, etc. Device 120 may further comprise or be associated with a processor for performing beamforming described herein, including, for example, performing calculations and directing an antenna to form a plurality of propagation paths. Although device 120 may be a transmitting device, a receiving device, or both, for simplicity it may be referred to as a remote device.

According to an embodiment of the invention, there may be an initial beamforming procedure, in which a transmitter and a receiver may identify a plurality of signal propagation paths, for example N paths. Identified paths may be selected from among a group of strongest signal paths. Channels of propagation paths may be estimated. A method of estimating a channel between a transmitter and a receiver over multiple propagation paths may be, for example, finding course directions of N strongest propagation paths, where a strongest path may be determined by one or more methods, e.g., signal strength. A course direction may be found by, for example, sweeping spatial sectors that may be predefined, and may be referred to as sector sweeping. A channel that may have undergone sector sweeping may be refined, for example, for each propagation path, for a fine direction. From such an exemplary signal propagation path identification, a source device may obtain channel-specific information, $h_n$, and a remote device may obtain channel specific information, $g_n$.

Figure 2:
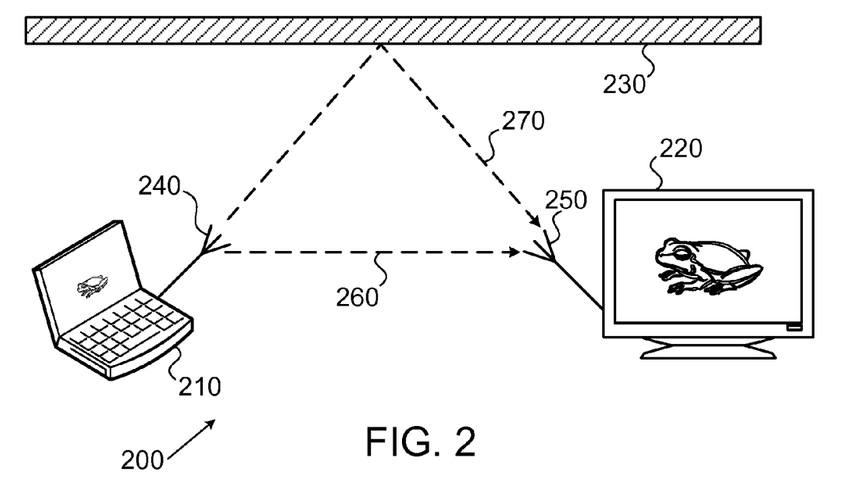
FIG. 2 depicts an exemplary block diagram illustrating an embodiment of a system according to embodiments of the present invention.

An embodiment of the invention may be described by reference to FIG. 2, showing a system 200 including a wireless channel having a plurality of paths. A wireless link may be formed between a source device 210 and a remote device 220. The source device may be, for example a computer, e.g. a laptop computer. The remote device may be, for example a display device, e.g. a television or video display. An antenna system, for example, an antenna array 240 may be operably connected to source device 210, and may have multiple antenna elements, for example Nt elements. An antenna system, for example, an antenna array 250 may be operably connected to a remote device 220, and may have multiple antenna elements, for example Nr elements. A first, direct, propagation path 260 may be determined to be between a source device 210 and a remote device 220 in a channel, for example $H_1$, and be available for communication between a source device 210 and a remote device 220. A second, indirect, propagation path 270 may be determined to be between a source device 210 and a remote device 220 in a channel, for example $H_2$, and be available for communication between a source device 210 and a remote device 220. Propagation path 270 and/or other propagation paths may be indirect propagation paths, and may be established by signals reflecting off of one or more surface or objects, such as object 230, which may be reflective to signals and/or signal energy. For example, a second propagation path 270 may be established by a reflection off of an object 230 for signals that may travel to and/or from a source device 210 and a remote device 220. A matrix, $H_n$, may be determined from a link between antennas that may have a number of elements Nt and Nr, where $$H_n = h_n \lambda_n g_n^T$$

and $h_n$ may be a ($N_t \times 1$) channel vector, for example a transmit channel vector, and may be over an n-th propagation path, and $g_n$ $h_n$ may be a ($N_r \times 1$) channel vector, for example a receive channel vector, and may be over an n-th propagation path. $\lambda_n$ may be a channel gain over an n-th propagation path, and $T$ may be a transpose mathematical operator.

Figure 3:
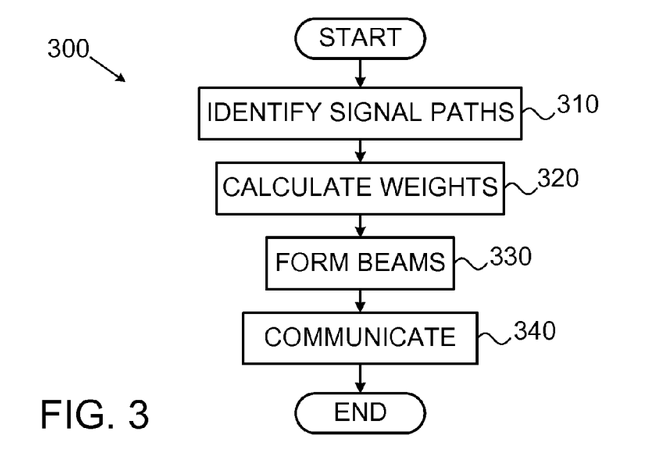
FIG. 3 depicts a method according to embodiments of the present invention.

In an embodiment of the invention a wireless link may operate according to an exemplary method 300 of FIG. 3. A plurality of signal paths between a source device and a remote device may be identified 310, in a manner substantially as described above. Weight vectors may be calculated 320 by a source device and a remote device, for example a transmitter and a receiver. A plurality of paths, for example, a plurality of strongest paths selected among all available paths, for example, the N strongest paths, may be identified for communication, for example, data communication, between a source device and a remote device. A source device may calculate an ($N_t \times 1$) weight vector, $w_t$, that may be used to direct beams of an antenna, where beams may be directed along a plurality of paths, for example strongest paths. A plurality of paths may be N strongest paths, and may be according to:

$$[h_1 h_2 \ldots h_N]^T w_t = [\alpha_1 \alpha_2 \ldots \alpha_N]^T$$

where $\alpha_n$ may be a complex number and may represent a gain and a phase of an n-th antenna communication beam, where n may be an integer between 1 and N, inclusive. A remote device may calculate an ($N_r \times 1$) weight vector, $w_r$, that may be used to direct beams of an antenna, where beams may be directed along a plurality of paths, for example strongest paths. A plurality of paths may be N strongest paths, and may be according to $$w_r [g_1 g_2 \ldots g_N]^T = [\beta_1 \beta_2 \ldots \beta_N]^T$$

where $\beta_n$ may be a complex number and may represent a gain and a phase of an n-th antenna communication beam, where n may be an integer between 1 and N, inclusive. A solution to the above equations may be found by any known method, for example, an inverse of $[h_1 h_2 \ldots h_N]^T$ and $[g_1 g_2 \ldots g_N]^T$ may be taken on both sides of the above equations, as $$w_t = ([h_1 h_2 \ldots h_N]^T)^{-1} [\alpha_1 \alpha_2 \ldots \alpha_N]^T$$

$$w_r^T [\beta_1 \beta_2 \ldots \beta_N][g_1 g_2 \ldots g_N]^{-1}$$

Antenna beams may be formed 330 at a source device and at a remote device by using, for example, results of the above calculations to control one or more gains and/or one or more phase settings of each antenna. For example, a control of phase of a source device antenna by $\alpha_n$ and a control of phase of a remote device antenna by $\beta_n$ may allow signals, e.g. multipath signals, to be added coherently. Corresponding antenna patterns at a source device antenna and at a remote device antenna that may allow signals, for example multipath signals, to add coherently may allow communication 340 between a source device and a remote device, and communication may be over a plurality of signal paths. Communication may continue over a link between a source device and a remote device with at least one signal path connected, and a connected signal path may be from among a plurality of signal paths.

Figure 4:
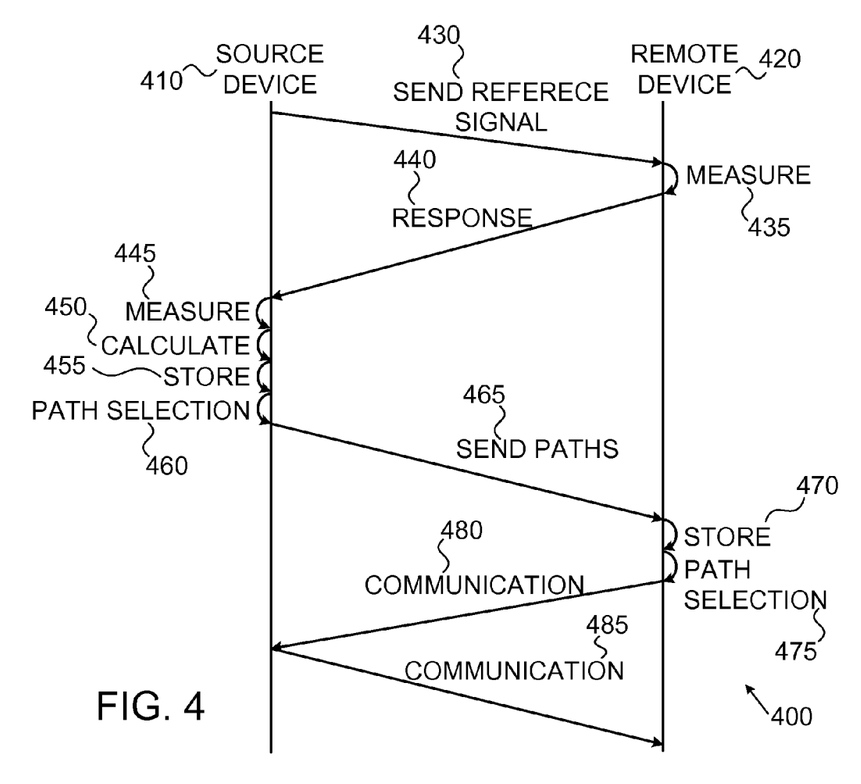
FIG. 4 depicts a method according to embodiments of the present invention.

An embodiment of the invention may be described by reference to the schematic communication diagram 400 of FIG. 4. A source device, identified by line 410 and a remote device, identified by line 420, may be spatially separated, and may wish to establish wireless communication therebetween. Source device may send a reference signal 430, which may be received at the remote device along a propagation path between the devices. Remote device may measure 435 a received signal, and may use one or more parameters for measurement, e.g. signal strength, phase, or the like. Remote device may send a response signal 440, which may be received by the source device, along a propagation path between the devices. Source device may measure 445 a received signal based on a strength parameter, e.g., received signal strength (RSSI), phase, phase shift, or the like. The process of sending additional reference signals, and receiving additional response signals may be repeated for different propagation paths between the devices, and measurements may be performed for each propagation path.

Source device may perform calculations 450 based on measurements made, and may be substantially as described above. Calculations may be performed by a processor associated with or embedded in the source device. Measurements, calculation and/or results of calculations may be stored 455, for example in a memory associated or embedded in the source device. A plurality of paths may be selected 460 for transmission of signals and communication between a source device and a remote device, and based on a path selection 460 an antenna or antenna system may be controlled, for example by adjusting gain and/or phase of signals sent to the antenna or antenna system for communication. As discussed above, the antenna or antenna system may be an array antenna, and may have a plurality of antenna elements each capable of being adjusted for gain and/or phase, independently of the gain and/or phase of other antenna elements. Path selection information may be stored in a memory.

Source device may send path information 465 to a remote device, and may also send results of calculations, or any other information that may relate to path selection and/or control of an antenna, for example gain and/or phase control. Remote device may store 470 path selection information, and/or antenna control information, for example, gain and/or phase control information. From information received, a plurality of paths may be selected 475 for transmission of signals and communication between the source device and the remote device, and based on a path selection 470, an antenna system, may be controlled, for example, by adjusting gain and/or phase of signals sent to the antenna system for communication. An antenna system may be an antenna array, and may have a plurality of antenna elements that may be independently adjusted for gain and/or phase, and each element may be adjusted for a same or a different gain and/or phase. Path selection information may be stored in a memory. Communication 480 may proceed between the remote device and the source device, and communication 485 may proceed between the source device and the remote device. Communication may be along a plurality of propagation paths, and paths may be determined by control of an antenna, for example, an array antenna at the source device and by control of an antenna, for example an array antenna, at the remote device, where antenna beams from each antenna may be adjusted to correspond to a same set of propagation paths.

Figure 5:
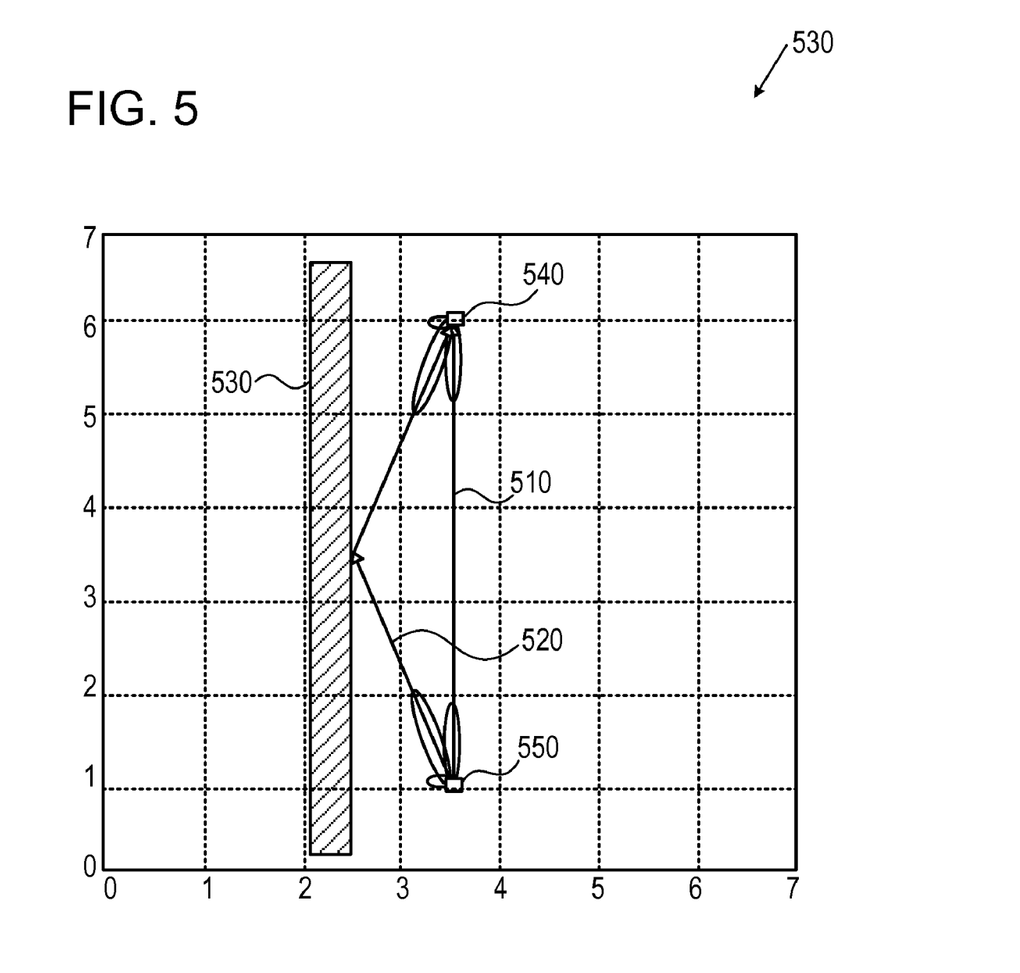
FIG. 5 depicts an exemplary block diagram illustrating an embodiment of a system according to embodiments of the present invention.

In an embodiment of the invention, a source device and a remote device, for example a transmitter and a receiver, may have a plurality of propagation paths between them, and one or more propagation paths may be strong propagation paths. A diagram of an exemplary embodiment 500 is shown in FIG. 5. A source device 540, for example a transmitter, may be located a distance from a remote device 550, for example, a receiver, and they may be communicating with each other. Each device may have an antenna system with a corresponding antenna beam pattern, which may be used to communicate along one or more propagation paths. For example, an antenna may be a square antenna and may have thirty-two antenna elements. An antenna may be an antenna array and may be a square antenna, for example a 4×4 antenna with, for example 16 antenna elements. Each element may radiate as a single antenna and, for example, 16 antenna elements may radiate as a single antenna, e.g., using the same or similar data signal propagated using the antenna array. Each antenna system may be characterized, for example, by a main lobe and one or more side lobes of, for example, a respective antenna radiation pattern. A beam may be formed, for example, in a plurality of directions. A strongest signal propagation path 510 may be a line of sight (LOS) signal propagation path from transmitting device 540 to receiving device 550. A second strongest signal propagation path 520 may be a signal propagation path that may originate at a transmitting device 540 and terminate at a receiving device 550 and may reflect off an object 530, e.g., a wall, and may form a reflected path. An embodiment of the invention may include an antenna system at transmitting device 540 that may have a beamforming pattern to support a plurality of signal propagation paths, and an antenna system at receiving device 550 that may also have a beamforming pattern to support a plurality of signal propagation paths. At each of a transmitter and a receiver, at least two beams may be formed, for example in a direction of each of at least two respective strongest paths. One beam may be formed along a direction of a line of sight (LOS) path 510, and one beam may be formed along a direction of a reflected path 520. A complex value that may be associated with gains and phases of signals transmitted from a transmitter antenna may be $\alpha_n$, and a complex value that may be associated with gains and phases of signals received from a receiver antenna may be $\beta_n$, and n may refer to a signal propagation path, e.g. 1 may refer to a LOS path 510, 2 may refer to a reflected signal path 520, etc. A gain of a signal that may be transmitted along a reflected path 520 may be increased, and may compensate for an additional loss that may be from a wall, or other reflector, e.g. $\alpha_1=\beta_1=1$, and $\alpha_2=\beta_2=1.2$.

Figure 6:
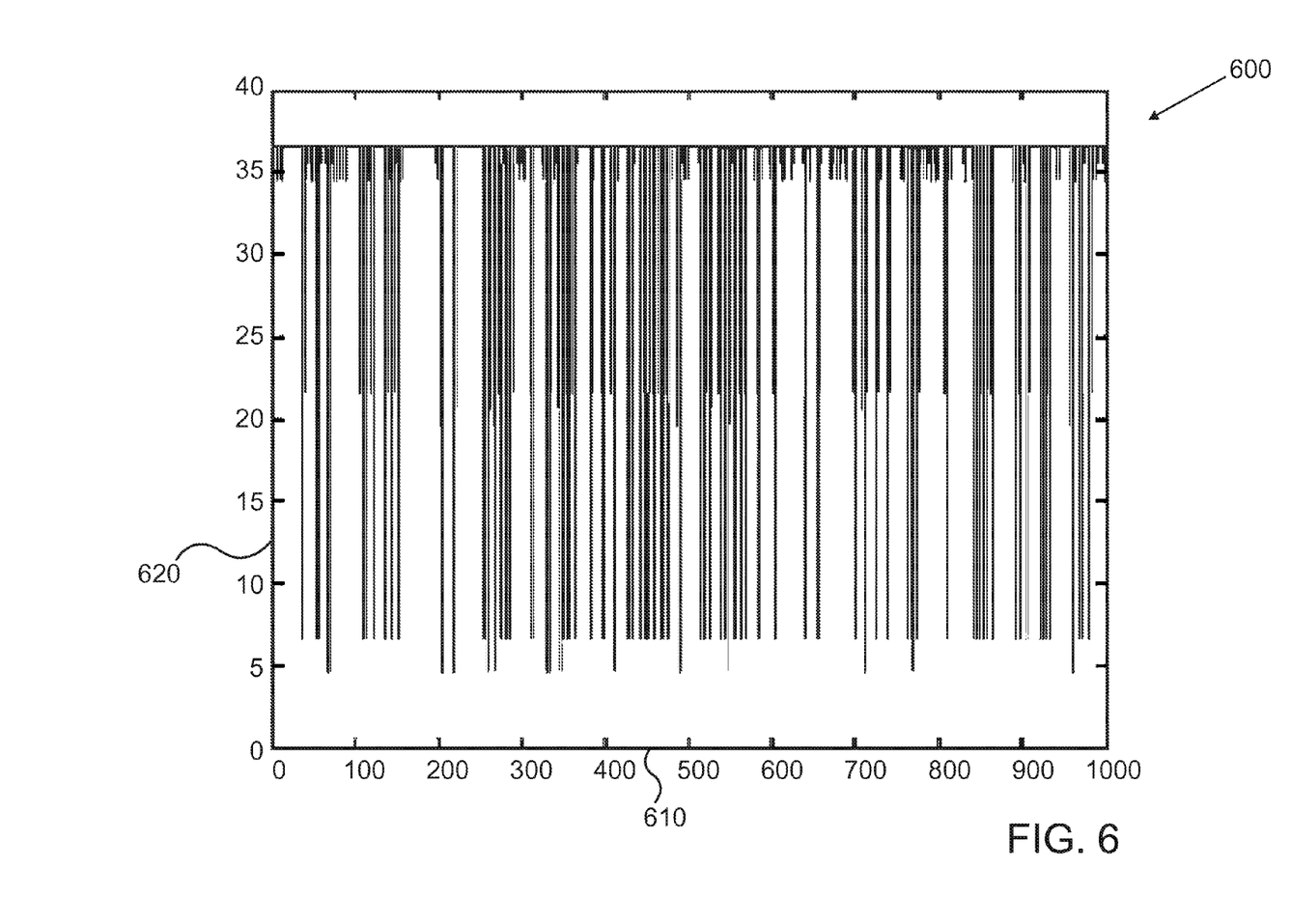
FIG. 6 depicts an exemplary graph according to an embodiment of the present invention.

In another embodiment of the invention, there may be two signal propagation paths, for example a LOS path and a reflected path. An exemplary embodiment may be each signal propagation path may be blocked and may have, for example, a 10% probability of being blocked. A signal may be attenuated, and may have attenuation due to a blocking, for example, of around 30 dB. An attenuation from a wall may be, for example, 10 dB. A transmit power may be set to, for example a fixed power, e.g. 10 dBm. An exemplary graph 600 of performance data may be shown by FIG. 6, where such data may have been found by measuring a LOS propagation path. A signal-to-noise ratio (SNR) 620 may be plotted versus a number of measurements 610 of a LOS signal propagation path, and may achieve a high SNR, for example approximately 35 dB. Such SNR may be measured for a propagation path that may not be blocked, for example by an object. A propagation path that may be blocked may experience a reduction of an SNR versus a propagation path that may be unblocked. A propagation path that may be blocked with a certain probability, e.g. 10%, for example 10% of a period of time, may have a reduced SNR from an unblocked condition. For example, a LOS propagation path that may be blocked with a certain probability, e.g. 10%, may experience a drop of SNR during a blocked condition to a lower SNR, e.g. a SNR of approximately 5 dB to 6 dB, from 35 dB. A graph of performance of a propagation channel 600 may illustrate this condition, as data may be plotted between, for example 35 dB and 5 dB or 6 dB, depending if a data line may represent an unblocked or a blocked propagation path, respectively. A ratio of a number of data points that may be below a threshold, for example 8 dB, versus a number of data points that may be at a high SNR, e.g. 35 dB, may be high for a blocked path condition, and it may be difficult to maintain a wireless link.

Figure 7:
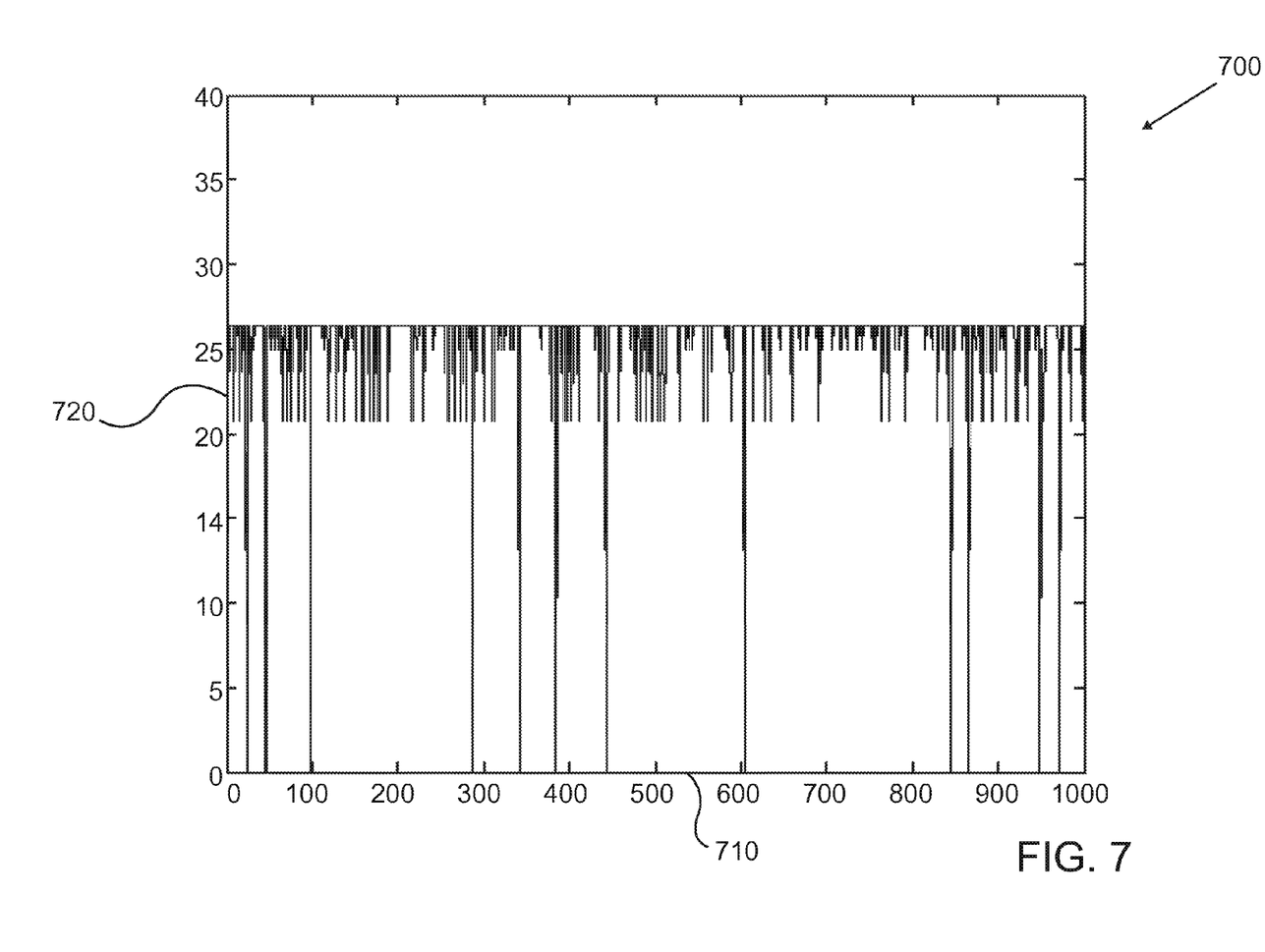
FIG. 7 depicts an exemplary graph according to an embodiment of the present invention.

In an embodiment of the invention, a source device and a remote device may communicate over a plurality of signal propagation paths, e.g. two paths. An exemplary graph (700 of performance data may be shown by FIG. 7, where such data may have been found by measuring, for example two propagation paths, and data may have been communicated simultaneously over both paths, in accordance with a method described above. A signal-to-noise ratio (SNR) (720 may be plotted versus a number of measurements (710 of both signal propagation paths, or a total link, and may achieve an SNR, for example approximately 25 dB. Such SNR may be measured for a propagation path that may not be blocked, for example by an object. A propagation path that may be blocked may experience a reduction of an SNR versus a propagation path that may be unblocked. A propagation path that may be blocked with a certain probability, e.g. 10%, for example 10% of a period of time, may have a reduced SNR from an unblocked condition. For example, one of two simultaneous propagation paths of a link that may be blocked with a certain probability, e.g. 10%, and a link may experience a drop of SNR during a blocked condition to a lower SNR, e.g. a SNR of approximately 21 dB, from 25 dB. A graph of performance of a link with, for example two simultaneous signal propagation paths (700 may illustrate this condition, as data may be plotted between, for example 25 dB and 21 dB, depending if a data line may represent an unblocked or a blocked propagation path, respectively. A ratio of a number of data points that may be below a threshold, for example 15 dB, versus a number of data points that may be at a high SNR, e.g. 25 dB, may be low for a blocked path condition, and it a wireless link may be easily maintained. An SNR may be maintained above a threshold, e.g. 20 dB, for a greater amount of time, e.g. approximately 99% probability. A link quality that may be supported may be very good, and may have a high link quality for wireless applications.

In an embodiment of the invention, an antenna may be an array antenna and may have a radiation pattern of a main beam and one or more additional beams. Additional beams may be formed from, for example sidelobes of a main beam, or may be independent beams. A larger number of antenna beams may allow an increase in spatial diversity of a communication ability of an antenna. A larger number of antenna beams may distribute transmitted power from a main beam to among a plurality of beams. Beams may be formed over two or more directions. An embodiment of the invention may use an antenna that may be configured as a radiated pattern transmitter and/or receiver.

Another embodiment of the invention may re-measure and/or update propagation path information frequently. New and/or updated propagation path information may be used to update one or more antenna control parameters. Re-measuring and/or updating propagation path information may be beneficial as an environment may change, or, for example, one or more obstacles may move position. Updated antenna control parameters may be used to maintain spatial diversity, and may be on a plurality of propagation paths. Maintaining spatial diversity may maintain a wireless link quality.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method comprising:
   determining by a source device a plurality of signal quality parameters associated with a respective plurality of wireless signal propagation paths for wireless communication with a remote device;
   determining by said source device at least one antenna control parameter based on said signal quality parameters, wherein determining said at least one antenna control parameter comprises transmitting from said source device a first signal along a first wireless signal propagation path, receiving at said source device a second signal, which is based on said first signal, along said first wireless signal propagation path, transmitting from said source device a third signal along a second wireless signal propagation path, receiving at said source device a fourth signal, which is based on said third signal, along said second wireless signal propagation path, and determining said at least one antenna control parameter based on said second and fourth signals;
   transmitting data to said remote device via an antenna system associated with said source device using said determined antenna control parameter.

2. The method of claim 1, wherein said antenna system is an antenna array.

3. The method of claim 2, wherein transmitting data to said remote device via said antenna system comprises forming a plurality of transmission beams by said antenna array, said plurality of transmission beams corresponding to said plurality of wireless signal propagation paths.

4. The method of claim 3, wherein a transmission beam of said plurality of transmission beams is formed by a plurality of antenna elements of said antenna array.

5. The method of claim 1, comprising sending said determined antenna control parameter to said remote device.

6. The method of claim 1, comprising selecting a subset of said plurality of wireless signal propagation paths from a plurality of available wireless signal propagation paths based on said signal quality parameters.

7. The method of claim 6, wherein selecting said subset of wireless signal propagation paths comprises selecting at least one wireless signal propagation path having greater signal quality parameters than other wireless signal propagation paths.

8. A system comprising:
   a source device capable of wirelessly communicating with a remote device, said source device operably connected to an antenna system,
      wherein said source device is to:
         determine a plurality of signal quality parameters associated with a respective plurality of wireless signal propagation paths for wireless communication with said remote device;
         determine at least one antenna control parameter based on said signal quality parameters, by transmitting a first signal along a first wireless signal propagation path, receiving from said remote device a second signal, which is based on said first signal, along said first wireless signal propagation path, transmitting a third signal along a second wireless signal propagation path, receiving from said remote device a fourth signal, which is based on said third signal, along said second wireless signal propagation path, and determining said at least one antenna control parameter based on said second and fourth signals; and
         transmit data to said remote device via said antenna system using said determined antenna control parameter.

9. The system of claim 8, wherein said antenna system comprises an antenna array.

10. The system of claim 9, wherein said antenna control parameter, when applied to said antenna array is to form a plurality of transmission beams by said antenna array, said plurality of transmission beams corresponding to said plurality of wireless signal propagation paths.

11. The system of claim 10, wherein a transmission beam of said plurality of transmission beams is formed by a plurality of antenna elements of said antenna array.

12. The system of claim 8, where said source device comprises a processor to determine said at least one antenna control parameter.

13. The system of claim 8, wherein said source device is to select a subset of said plurality of wireless signal propagation paths from a plurality of available wireless signal propagation paths based on said signal quality parameters.

14. The system of claim 8 comprising said remote device, wherein said source device is to send said antenna control parameter to said remote device, and wherein said remote device comprises a memory to store said antenna control parameter.

15. The system of claim 8,
   wherein said source device is to store said antenna control parameter in a memory associated with said source device,
   wherein said source device is to send said antenna control parameter to said remote device, and
   wherein said remote device is to store said antenna control parameter in a memory associated with said remote device.

16. A device comprising:
   a communication module to identify a plurality of propagation paths between a source device and a remote device, and to communicate data between said source device and said remote device simultaneously over said plurality of propagation paths by simultaneously forming a plurality of beamforming patterns directed to said plurality of propagation paths, respectively,
   wherein said communication module is to communicate a first signal along a first wireless signal propagation path between said source and remote devices, to communicate a second signal, which is based on said first signal, along the first wireless signal propagation path, to communicate a third signal along a second wireless signal propagation path between said source and remote devices, to
   communicate a fourth signal, which is based on said third signal, along the second wireless signal propagation path, and to determine said plurality of beamforming patterns based on said second and fourth signals.

17. The device of claim 16, wherein said communication module is to form said plurality of beamforming patterns by an antenna array, wherein a beamforming pattern of said plurality of beamforming patterns is formed by a plurality of antenna elements of said antenna array.

* * * * *

UNITED STATES PATENT AND TRADEMARK OFFICE
CERTIFICATE OF CORRECTION

PATENT NO. : 8,306,483 B2  
APPLICATION NO. : 12/647233  
DATED : November 6, 2012  
INVENTOR(S) : Minyoung Park Page 1 of 1

It is certified that error appears in the above-identified patent and that said Letters Patent is hereby corrected as shown below:

IN THE CLAIMS:

In column 9, line 37, in claim 5, delete "claim 1," and insert -- claim 1 --, therefor.

In column 9, line 39, in claim 6, delete "claim 1," and insert -- claim 1 --, therefor.

In column 10, line 11, in claim 10, delete "array" and insert -- array, --, therefor.

Signed and Sealed this  
Twelfth Day of March, 2013

Teresa Stanek Rea  
*Acting Director of the United States Patent and Trademark Office*